(12) United States Patent
Oakes et al.

(10) Patent No.: US 9,726,564 B2
(45) Date of Patent: Aug. 8, 2017

(54) SYSTEM AND METHOD FOR DETERMINING A PRESSURE DROP ACROSS A FILTER

(71) Applicant: Cummins, Inc., Columbus, IN (US)

(72) Inventors: Jeffrey L. Oakes, Columbus, IN (US); Gabriel Moreno, Columbus, IN (US)

(73) Assignee: Cummins, Inc., Columbus, IN (US)

( * ) Notice: Subject to any disclaimer, the term of this patent is extended or adjusted under 35 U.S.C. 154(b) by 125 days.

(21) Appl. No.: 14/698,141

(22) Filed: Apr. 28, 2015

(65) Prior Publication Data

US 2016/0320257 A1 Nov. 3, 2016

(51) Int. Cl.
*G01L 19/00* (2006.01)
*G01L 19/06* (2006.01)
*B01D 29/60* (2006.01)

(52) U.S. Cl.
CPC ........ *G01L 19/0092* (2013.01); *B01D 29/606* (2013.01); *G01L 19/0618* (2013.01)

(58) Field of Classification Search
None
See application file for complete search history.

(56) References Cited

U.S. PATENT DOCUMENTS

| | | | | |
|---|---|---|---|---|
| 3,812,816 | A * | 5/1974 | Juhasz | B01D 35/143 116/220 |
| 4,153,003 | A * | 5/1979 | Willis | G01L 7/16 116/268 |
| 5,477,731 | A | 12/1995 | Mouton | |
| 6,334,959 | B1 | 1/2002 | Sutton et al. | |
| 6,471,853 | B1 | 10/2002 | Moscaritolo | |
| 2003/0226809 | A1 | 12/2003 | Zagone et al. | |
| 2010/0024563 | A1* | 2/2010 | Mulligan | G01L 19/0627 73/716 |
| 2015/0247773 | A1* | 9/2015 | Wagner | G01L 9/0052 73/721 |
| 2015/0247776 | A1* | 9/2015 | Wagner | G01L 13/025 73/431 |
| 2015/0343348 | A1* | 12/2015 | Morris | B01D 35/14 210/90 |

* cited by examiner

*Primary Examiner* — Andre Allen
(74) *Attorney, Agent, or Firm* — Foley & Lardner LLP

(57) ABSTRACT

Systems, methods, and apparatuses provided herein relate to a controller for determining a pressure differential across a fluid filter by receiving inlet pressure data regarding a pressure of the fluid upstream of the filtering element, receiving outlet pressure data regarding a pressure of the fluid downstream of the filtering element, receiving engine speed data regarding a speed of the engine, receiving temperature data regarding a temperature of the fluid, and determining a pressure drop across the filtering element based on the inlet pressure data, the outlet pressure data, the engine speed data, and the temperature data.

20 Claims, 7 Drawing Sheets

SYSTEM AND METHOD FOR DETERMINING A PRESSURE DROP ACROSS A FILTER

TECHNICAL FIELD

The present disclosure relates to fluid filter systems. More particularly, the present disclosure relates to diagnostics and prognostics for fluid filter systems used with engine systems.

BACKGROUND

Diagnostic and prognostic procedures are used in internal combustion engine systems to determine maintenance schedules, troubleshoot potentially faulty components, and, among other purposes, to verify the functionality of one or more components (e.g., a torque converter in an automatic transmission vehicle). When embodied in a vehicle, many of these procedures are implemented with an on-board detection (OBD) unit in the vehicle. When a fault is determined, the OBD unit may provide, for example, a fault code in the form of an indicator lamp to an operator of the vehicle. While many of these procedures may be implemented with the OBD unit, some procedures are best implemented in a service technician setting. In either configuration, many of the procedures utilize data collected from sensors (e.g., an engine speed) to make one or more determinations. For example, sensors such as a differential pressure sensor have been developed to measure the change in fluid pressure across a fluid filter to monitor fluid filter performance. However, differential pressure sensors typically require additional plumbing, hose routing, and/or brackets which add cost and complexity to the fluid filter system. This complexity not only prevents ease of service or maintenance of the pressure sensor, but this configuration may also result in errors in the diagnostic and prognostic procedures due to the complexity in the system.

SUMMARY

One embodiment relates to an apparatus. The apparatus includes an inlet pressure module, an outlet pressure module, an engine module, a temperature module, and a filter module. The inlet pressure module is structured to interpret inlet pressure data regarding a pressure of a fluid upstream of a fluid filter. The outlet pressure module is structured to interpret outlet pressure data regarding a pressure of the fluid downstream of the fluid filter. The engine module is structured to interpret engine speed data regarding a speed of an engine. The temperature module is structured to interpret temperature data regarding a temperature of the fluid. The filter module is structured to determine a pressure drop across the fluid filter responsive to the inlet pressure data, the outlet pressure data, the engine speed data, and the temperature data. Accordingly, the apparatus is structured to determine a pressure differential across a fluid filter without the need of a differential pressure sensor. Because differential pressure sensors often require additional plumbing and hardware and the apparatus does not utilize a differential pressure sensor, the apparatus is provides for a relatively less complex fluid filtering system monitor than other systems. This configuration affords many benefits and advantages relative to conventional systems, such as an ease of maintenance, an ease of installation, lower costs, etc. Furthermore, according to one embodiment, the apparatus is able to determine the pressure differential with a greater than ninety-percent accuracy. Accordingly and technically, the apparatus provides for a relatively lower complex system while still providing for an accurate pressure differential determination diagnostic and prognostic process.

Another embodiment relates to a system. The system includes an engine; a fluid filter system including a filtering element structured to filter a fluid flowing through the fluid filter system; and a controller communicably coupled to the engine and the fluid filter system. The controller is structured to: receive inlet pressure data regarding a pressure of the fluid upstream of the filtering element; receive outlet pressure data regarding a pressure of the fluid downstream of the filtering element; receive engine speed data regarding a speed of the engine; receive temperature data regarding a temperature of the fluid; and determine a pressure drop across the filtering element based on the inlet pressure data, the outlet pressure data, the engine speed data, and the temperature data.

Another embodiment relates to a method. The method includes receiving inlet pressure data regarding a pressure of a fluid upstream of a fluid filter; receiving outlet pressure data regarding a pressure of the fluid downstream of the fluid filter; receiving engine speed data regarding a speed of an engine; receiving temperature data regarding a temperature of the fluid; and determining a pressure drop across the fluid filter based on the inlet pressure data, the outlet pressure data, the engine speed data, and the temperature data.

These and other features, together with the organization and manner of operation thereof, will become apparent from the following detailed description when taken in conjunction with the accompanying drawings.

DETAILED DESCRIPTION

Figure 1:
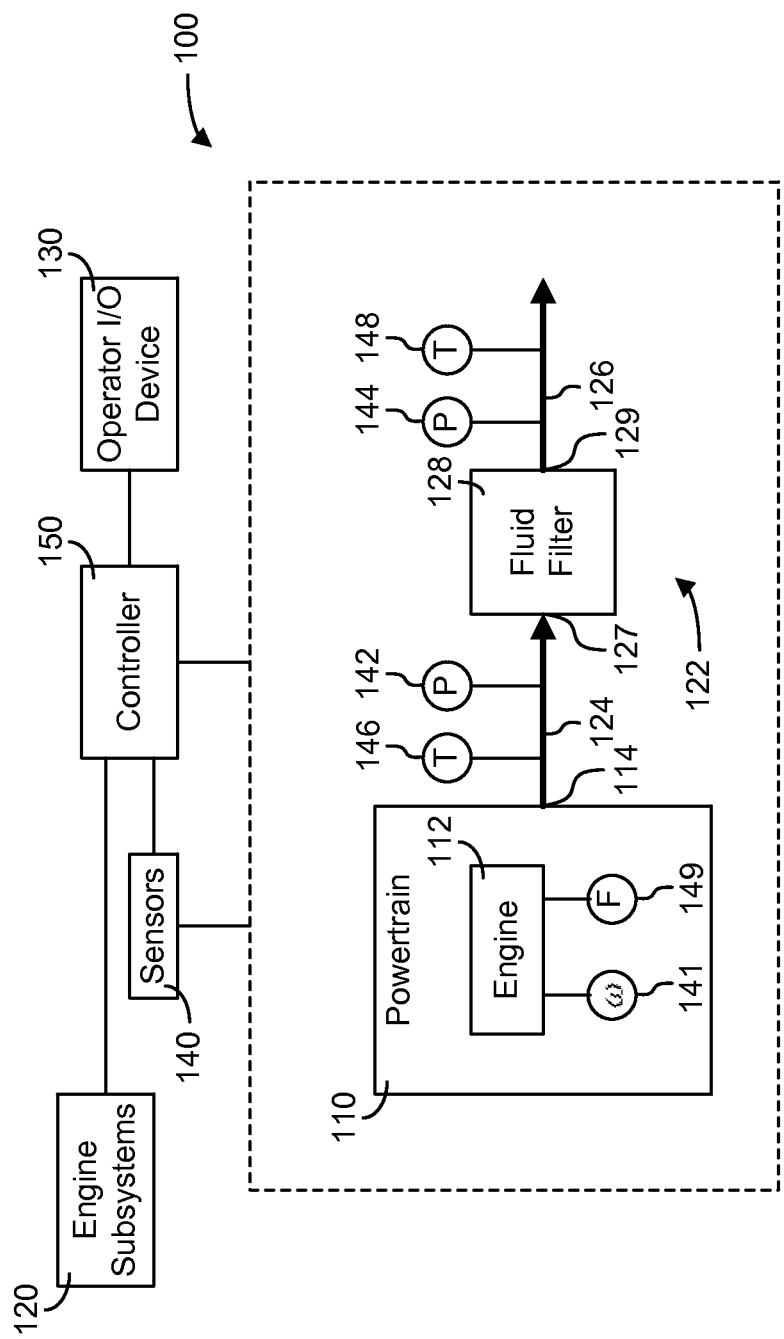
FIG. 1 is a schematic diagram of an engine system with a controller, according to an example embodiment.

Following below are more detailed descriptions of various concepts related to, and implementations of, methods, apparatuses, and systems for determining the pressure drop across a fluid filter. The various concepts introduced above and discussed in greater detail below may be implemented in any of numerous ways, as the described concepts are not limited to any particular manner of implementation. Examples of specific implementations and applications are provided primarily for illustrative purposes.

Referring to the Figures generally, a system and method are shown for determining the pressure drop across a fluid filter (e.g., oil filter, etc.) in a fluid filter system. Traditionally, an oil filter is replaced when the engine oil is changed. However, it has been shown that many oil filters may be prematurely discarded, which unnecessarily increases maintenance expenses and time spent servicing the fluid filter. Traditionally, to determine when an oil filter should be changed requires determining the pressure drop across the oil filter via a relatively expensive differential pressure sensor. Using differential pressure sensors often require relatively more components which leads to a relatively less reliable system and increases the cost, complexity, and time to install/replace the equipment of the system. For example, brackets may be required to attach the differential pressure sensor to the fluid filter system; differential pressure sensors may require additional tubing in order to connect to an inlet and outlet of the fluid filter; etc. According to the present disclosure, a first pressure sensor is positioned upstream of the fluid filter and a second pressure sensor is positioned downstream of the fluid filter. The first and second pressure sensors are used to measure the pressure of fluid flowing through the fluid filter. By adding the first pre-filter pressure sensor, the need for a differential pressure sensor may be eliminated. Because the addition of a pressure sensor is substantially less complicated than the addition of a differential pressure sensor (e.g., less components such as plumbing and brackets, etc.), the arrangement of the present disclosure tends to decrease both the cost and number of components required to monitor the pressure drop across the fluid filter. As a result, the complexity of the system is reduced, which increases the reliability of the system (e.g., less components that could fail, etc.) and decreases the time to install/replace/repair the pressure sensors.

According to the present disclosure, a controller is included with the system. The controller is structured to be communicably coupled to both the first and second pressure sensors as well as the engine. Accordingly, the controller is structured to receive temperature data regarding a temperature of the fluid, engine speed data regarding a speed of the engine, and pressure data regarding a pressure of the fluid. The temperature data may be acquired by a temperature sensor while the engine speed data is acquired by an engine speed sensor. Responsive to the pressure data, the temperature data, and the engine speed data, the controller may determine when the fluid (e.g., engine oil, etc.) and the fluid filter (e.g., oil filter, etc.) need to be replaced or serviced. Technically and advantageously, using the temperature, pressure, and engine speed data functions to determine a pressure differential across the fluid filter without the need of a differential pressure sensor. Consequently, the determined pressure differential may be used to determine or predict when the filter should be serviced (e.g., replaced). Furthermore, while in some embodiments, neither the first nor the second pressure sensor are as close to the filter as possible (which, advantageously, may decrease installation and repair costs if needed), the fluid flow rate changes are effectively accounted for by using the engine speed, pressure, and temperature data. This is due to the effect that fluid temperature and engine speed have on the fluid flow rate (e.g., a lower temperature increases the viscosity which lowers the flow rate and a higher engine speed functions to pump the fluid at a higher rate which corresponds with a higher flow rate, etc.). By using the method and processes described herein, Applicants have determined that the pressure across the filter may be determined with at least a ninety percent accuracy rate. Thus, the present disclosure provides for a relatively accurate system and method for determining the pressure across a fluid filter with minor adjustments to existing systems, which may be beneficial in diagnosing and servicing the fluid filter.

An example operation of the controller may be as follows. The controller receives a characteristic regarding a fluid filter (e.g., a threshold pressure drop, etc.). The controller receives inlet pressure data and outlet pressure data regarding the pressure of a fluid (e.g., engine oil, etc.) flowing through a fluid filter (e.g., oil filter, etc.). The controller receives temperature data regarding the temperature of the fluid. The controller receives engine speed data regarding the speed of an engine. The controller interprets the foregoing data and determines a pressure drop across the fluid filter. The controller compares the characteristic to the pressure drop across the fluid filter. The controller determines a service for the fluid filter responsive to the comparison. For example, the controller may predict an optimal time to change at least one of the fluid filter and the fluid (e.g., such that the fluid filter or fluid are not prematurely serviced, etc.) responsive to the pressure drop across the fluid filter, filter data, and/or fluid data. These and other features are described more fully herein.

Referring now to FIG. 1, a schematic diagram of an engine system 100 with a controller 150 is shown, according to an example embodiment. According to one embodiment, the engine system 100 is embodied within a vehicle. The vehicle may include an on-road or an off-road vehicle including, but not limited to, line-haul trucks, mid-range trucks (e.g., pick-up truck, etc.), sedans, coupes, tanks, airplanes, and any other type of vehicle. In other embodiments, the engine system 100 may be implemented in stationary devices, such as a power generator. All such variations are intended to fall within the spirit and scope of the present disclosure. Further, while FIG. 1 depicts the engine system 100 as including an internal combustion engine 112, the engine system 100 may be powered by any type of power source. For example, the engine system 100 may be a hybrid system, a full electric system, and/or an internal combustion engine powered system as shown. These and other features of the present disclosure are described more fully herein below.

As shown in FIG. 1, the engine system 100 generally includes a powertrain system 110, engine subsystems 120, an operator input/output (I/O) device 130, sensors 140 communicably coupled to one or more components of the engine system 100, and a controller 150. Communication between and among the components of the engine system 100 may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 150 is communicably coupled to the systems and components in the engine system 100 of FIG. 1, the controller 150 may receive data from one or more of the components shown in FIG. 1. For example, the data may include fluid pressure data and temperature data acquired via one or more of the sensors 140. As another example, the data may include an input from operator I/O device 130. As described more fully herein, with this data, the controller 150 determines the pressure drop across a fluid filter.

As shown in FIG. 1, the powertrain system 110 includes an engine 112. The powertrain system 110 may include any type of components typically included in powertrain systems. For example, the powertrain system 110 may also include (but is not limited to) a transmission, a drive shaft, a differential, and a final drive. As a brief overview, in a vehicle implementation, the engine 112 receives a chemical energy input (e.g., a fuel such as gasoline, diesel, etc.) and combusts the fuel to generate mechanical energy, in the form of a rotating crankshaft. The transmission receives the rotating crankshaft and manipulates the speed of the crankshaft (i.e., the engine revolutions-per-minute (RPM), etc.) to affect a desired drive shaft speed. The rotating drive shaft is received by the differential, which provides the rotational energy of the drive shaft to the final drive. The final drive then propels or moves the vehicle.

The engine 112 may be structured as any internal combustion engine (e.g., compression-ignition, spark-ignition, etc.), such that it may be powered by any fuel type (e.g., diesel, ethanol, gasoline, etc.). Similarly, the transmission may be structured as any type of transmission, such as a continuous variable transmission, a manual transmission, an automatic transmission, an automatic-manual transmission, a dual clutch transmission, etc. Accordingly, as transmissions vary from geared to continuous configurations (e.g., continuous variable transmissions, etc.), the transmission can include a variety of settings (gears, for a geared transmission) that affect different output speeds based on the engine speed. Like the engine 112 and the transmission, the drive shaft, differential, and final drive may be structured in any configuration dependent on the application (e.g., the final drive is structured as wheels in an automotive application and a propeller in an airplane application, etc.). Further, the drive shaft may be structured as any type of drive shaft including, but not limited to, a one-piece, a two-piece, and a slip-in-tube driveshaft based on the application.

The engine system 100 is also shown to include engine subsystems 120. The engine subsystems 120 may include both electrically-powered engine accessories and engine driven accessories, as well any other type of subsystem in the engine system 100. For example, a subsystem may include an exhaust aftertreatment system. The exhaust aftertreatment system may include any component used to reduce exhaust emissions (e.g., diesel exhaust emissions, gas exhaust emissions, etc.), such as selective catalytic reduction catalyst, a diesel oxidation catalyst, a diesel particulate filter, a diesel exhaust fluid doser with a supply of diesel exhaust fluid, and a plurality of sensors for monitoring the aftertreatment system (e.g., a NOx sensor, etc.). Furthermore, various accessories may include, but are not limited to, air compressors (for pneumatic devices), air conditioning systems, power steering pumps, engine coolant pumps, fans, and the like.

As shown, the engine system 100 includes a fluid filter system 122. The fluid filter system 122 may be structured as any type of fluid filter system included with the engine system 100, or in certain embodiments, a vehicle. Thus, the fluid filter system 122 may be structured to receive fluids such as oil, fuel, air, transmission fluid, hydraulic fluid, or any other fluid which may need to be filtered within the engine system 100. In one embodiment, the fluid filter system 122 is structured as an oil filter system that filters oil within the engine 112 and its various components to remove possible debris and particulates. For example, lubricating fluid (e.g., engine oil, etc.) may be used to reduce wear on the engine 112, carry away heat from the engine 112, clean the engine 112, and the like. However, debris and particles in the oil add friction to components—as compared to lubrication—which may deteriorate performance of such components. Accordingly, a filtering element, shown as fluid filter 128, may be included and structured to remove or substantially remove unwanted debris and particles from the fluid.

In another embodiment, the fluid filter system 122 may be structured as a fuel filter system for the engine system 100. The fuel filter system may receive fuel (e.g., diesel, gasoline, propane, etc.) from a fuel source such as a fuel storage tank. Unfiltered fuel may contain several kinds of contamination (e.g., paint chips, dirt, rust, etc.). If these contaminates are not substantially removed prior to the fuel entering the engine 112, rapid wear of the fuel pump, injectors, and other engine components may result. Accordingly, during operation, the fluid filter 128 may become clogged with contaminants, which restricts the flow of fuel and may cause a substantial drop in the performance of the engine 112.

In still other embodiments, the fluid filter system 122 may be included with a coolant system (e.g., attached to a radiator of a vehicle, etc.). In each of the aforementioned embodiments, the fluid filter system 122 described herein may be utilized. Accordingly, while the description provided herein is substantially in regard to an oil filter system, it should be understood that the fluid filter system 122 may be utilized with many other types of fluids (e.g., fuel, hydraulic fluid, coolant, etc.) with all such embodiments intended to be within the spirit and scope of the present disclosure.

Referring still to FIG. 1 and as mentioned above, the fluid filter 128 is structured as a filtering element. The fluid filter 128 may be a semi-permeable filter paper that filters and collects contaminants or debris (e.g., solids, etc.). In other embodiments, the fluid filter 128 may be structured as any type of filter media with any porosity and grade depending on the application. During typical operation, material/debris/particles build up on the fluid filter 128. The build-up may restrict fluid flow through the fluid filter 128, which may cause inefficient performance of the component(s) that use the filtered fluid. For example, when embodied as an oil filter, the oil pressure within the system may be relatively lower due to build-up, which corresponds with potential insufficient amounts of oil at intended locations (e.g., relatively lesser amounts of oil may be used to provide lubrication in a piston-cylinder system thereby causing increased friction between the components which causes an increase in wear and undesirable heat, etc.). Accordingly, due to build up, failure conditions may arise for the components that use the filtered fluid (and other components as well).

As shown in FIG. 1, the fluid filter 128 is in fluid communication with the engine 112. Accordingly, engine oil within the engine system 100 is directed to an inlet of the fluid filter 128, shown as fluid filter inlet 127, from an engine outlet 114 of the engine 112. The inlet fluid flow, shown as inlet engine oil flow 124, is filtered such that debris and unwanted particles are substantially removed from the engine oil. In turn, the outlet fluid flow, shown as filtered engine oil flow 126, exits the fluid filter 128 via fluid filter outlet 129 such that the filtered engine oil flow 126 may cycle back through the engine 112 and its components.

The sensors 140 are configured to measure, determine, estimate, etc., and transmit various data regarding the engine 112 and the fluid filter system 122 to the controller 150. As shown in FIG. 1, the sensors 140 include a first pressure sensor, shown as inlet pressure sensor 142, and second pressure sensor, shown as outlet pressure sensor 144, in communication with the inlet engine oil flow 124 and the filtered engine oil flow 126, respectively. In one embodiment, the inlet pressure sensor 142 is located at or near an oil cooler head (e.g., oil filter inlet, the fluid filter inlet 127, etc.) of the fluid filter system 122 or substantially close to the fluid filter inlet 127. In other embodiments, the inlet pressure sensor 142 is located elsewhere along the inlet engine oil flow 124 (e.g., anywhere between the engine outlet 114 and the fluid filter inlet 127, etc.). The inlet pressure sensor 142 is structured to measure, determine, etc. the pressure of the oil entering the fluid filter 128 (e.g., inlet pressure data, etc.). In one embodiment, the outlet pressure sensor 144 is located on or near an oil rifle of the fluid filter system 122. In other embodiments, the outlet pressure sensor 144 is located elsewhere along the filtered engine oil flow 126. The outlet pressure sensor 144 is structured to measure, determine, estimate, etc. the pressure of the oil leaving the fluid filter 128 (e.g., outlet pressure data, etc.). In some embodiments, the sensors 140 include a fluid sensor 149 (e.g., oil level sensor, oil gauge, etc.) structured to measure data regarding the level of the fluid (e.g., engine oil, etc.) and the quality of the fluid (e.g., degraded, clean, etc.).

The sensors 140 may further include an inlet temperature sensor 146 and an outlet temperature sensor 148 in communication with the inlet engine oil flow 124 and the filtered engine oil flow 126, respectively. The inlet temperature sensor 146 is structured to measure, determine, estimate, etc. a temperature (e.g., an inlet temperature) of the inlet engine oil flow 124, while the outlet temperature sensor 148 is structured to measure, determine, estimate, etc. a temperature of the outlet engine oil flow 126 (e.g., an outlet temperature). In one embodiment, the outlet temperature sensor 148 is located on or near an oil pan in the fluid filter system 122. In this configuration, the temperature of the oil refers to the temperature determined, measured, and/or estimated of the oil in the oil pan. In other embodiments, the outlet temperature sensor 148 is positioned elsewhere along the filtered engine oil flow 126. In some embodiments, the inlet temperature sensor 146 is omitted. The sensors 140 may further include an engine speed sensor 141 structured to determine, estimate, measure, etc. a speed of the engine 112. Since the inlet pressure sensor 142 and/or the outlet pressure sensor 144 may be positioned relatively far from the fluid filter 128, the differential between the inlet and outlet pressure data may provide a relatively inaccurate estimate of the pressure drop across the fluid filter 128. However, as described herein, Applicants have determined that the pressure drop across the fluid filter 128 may be substantially influenced by the engine speed and the engine oil temperature. That is, the engine speed and engine temperature, if not accounted for, may induce errors into the determined differential pressure between the inlet and outlet pressure sensors 142 and 144, respectively. Applicants have determined that the amount of error is inversely proportional to the oil temperature and directly proportional to the engine speed. For example, an increase in oil temperature decreases oil pressure, while an increase in engine speed increases oil pressure. According to the present disclosure, the controller 150 is structured receive and interpret the inlet pressure data, the outlet pressure data, the temperature data, and the engine speed data to compensate for the errors and determine the pressure drop of the engine oil across the fluid filter system 122. Technically and advantageously, the system and method described herein provides for a differential pressure determination process across the fluid filter 127 that represents the pressure drop across the fluid filter 128 with a greater than 90% accuracy. The greater than ninety-percent accuracy can be based on at least three different values for determining a true pressure differential. The three values can include, but are not limited to, a lab value, an accepted sensor value, and a correlation value. For example, an experiment may be used to determine a represented true pressure differential across the fluid filter, such that the systems and methods described herein determine a pressure differential with a greater than 90% accuracy relative to the experimental or lab value. Thus, the ninety-percent accuracy determination is meant to be broadly interpreted and applicable with many different true pressure differential determination processes, methods, measurements, and the like.

The operator I/O device 130 enables an operator of the engine system 100 to communicate with the engine system 100 and the controller 150. For example, the operator I/O device 130 may include, but is not limited, an interactive display, a touchscreen device, one or more buttons and switches, voice command receivers, etc. Via the operator I/O device 130, the operator may input filter and fluid data including, but not limited to, a threshold (e.g., maximum, etc.) pressure drop permitted for a given fluid filter 128, a type of fluid (e.g., engine oil, etc.), and a viscosity grade of the fluid (e.g., 15 W-40, 5 W-30, etc.). Accordingly, the controller 150 may monitor the pressure drop across the fluid filter 128, the engine oil level (e.g., via the fluid level sensor, etc.), and the quality of the fluid such that the controller 150 may determine when at least one of the fluid filter 128 and the engine oil should be changed (e.g., responsive to the pressure drop, the fluid data, the filter data, etc.). This is explained more fully in regard to FIG. 2.

As the components of FIG. 1 are shown to be embodied in an engine system 100, the controller 150 may be embodied as add-on to an electronic control module (ECM). Therefore, the controller 150 may be a stand-alone tool that performs all the required data logging, data tracking, data prediction, etc. needed for the analysis of the fluid filter system 122. While the ECM may include a transmission control unit and any other vehicle control unit (e.g., exhaust aftertreatment control unit, powertrain control module, engine control module, etc.). The function and structure of the controller 150 is described in greater detail in FIG. 2.

Figure 2:
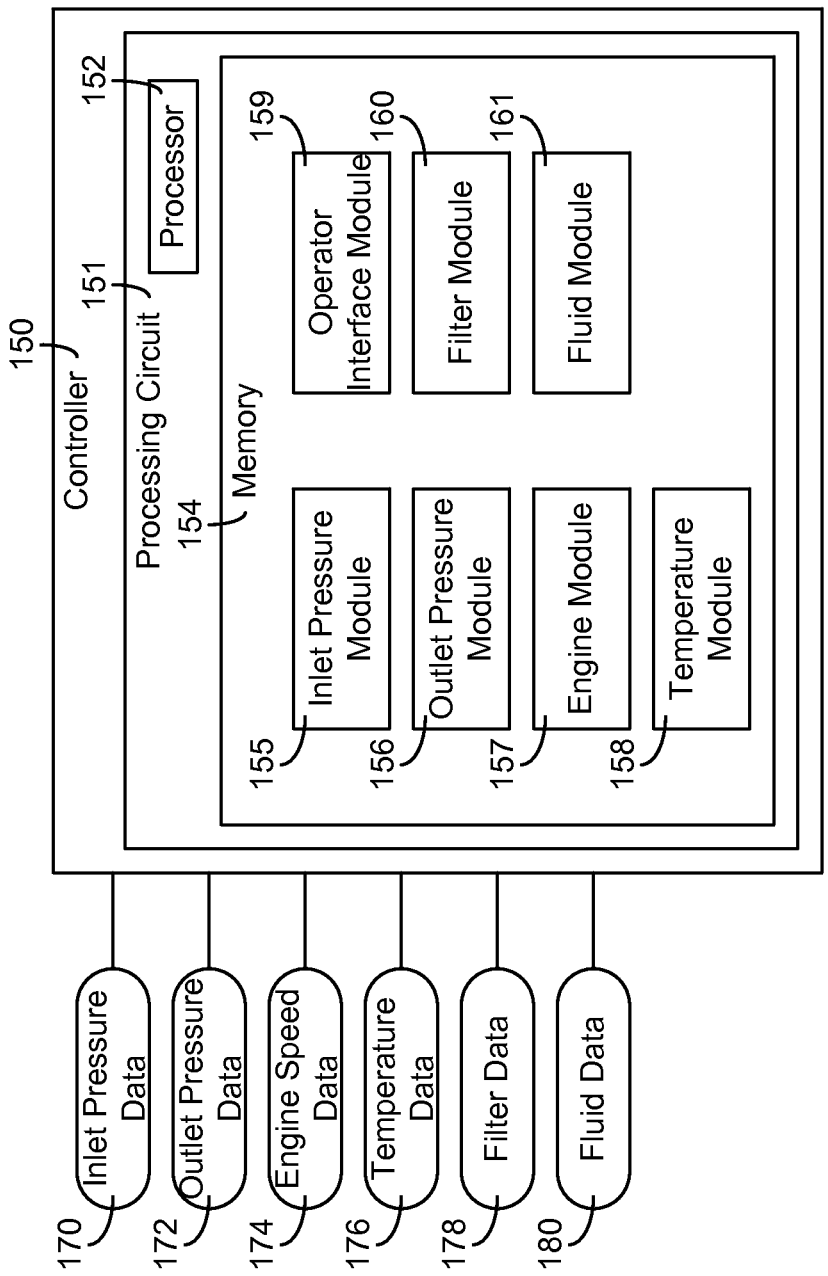
FIG. 2 is a schematic of the controller used with the engine system of FIG. 1, according to an example embodiment.

As such, referring now to FIG. 2, the function and structure of the controller 150 are shown according to one embodiment. The controller 150 is shown to include a processing circuit 151 including a processor 152 and a memory 154. The processor 152 may be implemented as a general-purpose processor, an application specific integrated circuit (ASIC), one or more field programmable gate arrays (FPGAs), a digital signal processor (DSP), a group of processing components, or other suitable electronic processing components. The one or more memory devices 154 (e.g., RAM, ROM, Flash Memory, hard disk storage, etc.) may store data and/or computer code for facilitating the various processes described herein. Thus, the one or more memory devices 154 may be communicably connected to the processor 152 and provide computer code or instructions to the processor 152 for executing the processes described in regard to the controller 150 herein. Moreover, the one or more memory devices 154 may be or include tangible, non-transient volatile memory or non-volatile memory. Accordingly, the one or more memory devices 154 may include database components, object code components, script components, or any other type of information structure for supporting the various activities and information structures described herein.

The memory 154 is shown to include various modules for completing the activities described herein. More particularly, the memory 154 includes modules structured to determine the pressure drop across the fluid filter 128. While various modules with particular functionality are shown in FIG. 2, it should be understood that the controller 150 and memory 154 may include any number of modules for completing the functions described herein. For example, the activities of multiple modules may be combined as a single module, as additional modules with additional functionality may be included, etc. Further, it should be understood that the controller 150 may further control other activity beyond the scope of the present disclosure.

Certain operations of the controller 150 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

As shown in FIG. 2, the controller 150 includes an inlet pressure module 155, an outlet pressure module 156, an engine module 157, a temperature module 158, an operator interface module 159, a filter module 160, and a fluid module 161. The inlet pressure module 155 is structured to receive and store inlet pressure data 170 regarding the pressure of the inlet engine oil flow 124 entering the fluid filter 128. Thus, the inlet pressure module 155 may be communicably coupled to the inlet pressure sensor 142. The outlet pressure module 156 is structured to receive and store outlet pressure data 172 regarding the pressure of the filtered engine oil flow 126 exiting the fluid filter 128. Thus, the outlet pressure module 156 may be communicably coupled to the outlet pressure sensor 144. In turn, the inlet pressure sensor 142 and the outlet pressure sensor 144 may measure the pressure differential between the two sensors, however as mentioned above, based on the location of the pressure sensors in relation to the fluid filter 128, this may not represent an accurate pressure differential across the fluid filter 128 (e.g., due to the oil temperature, engine speed, pressure loss between outlet pressure sensor 144 and the fluid filter outlet 129, etc.).

The rate at which the inlet pressure data 170 and the outlet pressure data 172 may be measured, estimated, determined, etc. and stored within each of the inlet pressure module 155 and the outlet pressure module 156 may be dependent on the sampling rate of the respective pressure sensors being used in the fluid filter system 122. In one embodiment, the inlet pressure data 170 and the outlet pressure data 172 are acquired at a rate substantially close to the maximum sampling rate of the pressure sensors. In other embodiments, the inlet pressure data 170 and the outlet pressure data 172 are acquired periodically (e.g., every ten seconds, every minute, every hour, etc.). The sampling rate may be predefined within the controller 150 or an operator may define the sampling rate via the operator I/O device 130. The inlet pressure data 170 and the outlet pressure data 172 stored by the inlet pressure module 155 and the outlet pressure module 156 may be provided to the filter module 160 for determining the pressure drop across the fluid filter 128.

The engine module 157 is structured to receive and store engine speed data 174 regarding the speed (e.g., revolutions-per-minute (RPM), etc.) of the engine 112. Thus, the engine module 157 may be communicably coupled to the engine speed sensor 141. The rate at which the engine speed data 174 may be measured and stored within the engine module 157 may be dependent on the sampling rate of the engine speed sensor 141 being used in the fluid filter system 122. In one embodiment, the engine speed data 174 is acquired at a rate substantially close to the maximum sampling rate of the engine speed sensor 141. In other embodiments, the engine speed data 174 is measured periodically (e.g., every ten seconds, every minute, every hour, etc.). In still other embodiments, the engine speed data 174 is acquired at substantially the same sampling rate as the inlet pressure data 170 and the outlet pressure data 172. The engine speed data 174 stored by the engine module 157 may be provided to the filter module 160 to aid in determining the pressure drop across the fluid filter 128, which is described more fully herein.

The temperature module 158 is structured to receive and store temperature data 176 regarding the temperature of the engine oil. Thus, the temperature module 158 may be communicably coupled to the inlet temperature sensor 146 and/or the outlet temperature sensor 148. As mentioned above, in one embodiment, at least one temperature sensor 146, 148 is positioned in, on, or near an oil pan in the fluid filter system 122. Accordingly, in this embodiment, the temperature data refers to the temperature of the oil measured, determined, and/or estimated in the oil pan. The rate at which the temperature data 176 may be measured and stored within engine module 157 may be dependent on the sampling rate of the respective temperature sensors being used in the fluid filter system 122. In one embodiment, the temperature data 176 is acquired at a rate substantially close to the maximum sampling rate of the temperature sensors 146 and 148. In other embodiments, the temperature data 176 is acquired periodically (e.g., every ten seconds, every minute, every hour, etc.). In still other embodiments, the temperature data 176 is acquired at substantially the same sampling rate as the inlet pressure data 170, the outlet pressure data 172, and/or engine speed data 174. The temperature data 176 stored by the temperature module 158 may be provided to the filter module 160 to aid in determining the pressure drop across the fluid filter 128, which is described more fully herein.

The operator interface module 159 may be communicably coupled to the operator I/O device 130 and is structured to receive one or more inputs from an operator of the engine system 100. The input may include a characteristic regarding the fluid filter 128, shown as filter data 178. The filter data 178 may include, but is not limited to, a type of filter (e.g., oil filter, fuel filter, etc.) and a threshold pressure drop (e.g., user defined, manufacturer defined, etc.). The threshold pressure drop refers to a prescribed or allowed differential pressure drop across the filter: if the determined pressure drop is at, near, or above (based on the application) the threshold pressure drop, an indicator may be provided to an operator (e.g., an indicator lamp, a fault code, etc.) via I/O device 130 that signals the operator to check or service the fluid filter. In this regard, as described more fully herein, the determined pressure drop in conjunction with the threshold pressure drop input may be utilized in a diagnostic process included with the controller 150 to determine a condition of the fluid filter. The input may also include fluid data 180. The fluid data 180 may refer to a type of fluid which is flowing through the fluid filter system 122 (e.g., engine oil, fuel, hydraulic fluid, transmission fluid, etc.) and/or a viscosity grade of the fluid (e.g., 5 W-30, etc.).

The filter module 160 is structured to interpret the inlet pressure data 170, the outlet pressure data 172, the engine speed data 174, and the temperature data 176 to determine a pressure drop across the fluid filter 128. The determined pressure drop across the fluid filter 128 may be used by the filter module 160 to monitor and determine a condition of the fluid filter 128 (e.g., replace, check, monitor, etc.). For example, the filter module 160 may determine the fluid flow through the fluid filter 128 is substantially restricted based on the determined pressure exceeding an inputted threshold pressure drop.

In one embodiment, the filter module 160 interprets the calculated pressure drop to determine/predict when the fluid filter may need to be changed (e.g., based on current trends such as a rate of increasing pressure drop, a trend of pressure drop over time, etc.). In another embodiment, the filter module 160 is structured to determine at least one of a condition and a service need of the fluid filter 128 based on the determined pressure compared to the threshold pressure drop. For example, if the determined pressure is within a first percentage of the threshold pressure drop (e.g., five percent), a monitoring notification may be provided to the I/O device 130. The monitoring notification may alert the operator that pressure appears to be building up in the fluid filter (i.e., a condition of the fluid filter), such that it is worth monitoring going forward. If the determined pressure is exceeds the threshold pressure drop by a certain percentage (e.g., fifteen percent of the threshold pressure drop), a replacement notification may be provided to the I/O device 130. The replacement notification may alert the operator that pressure in the fluid filter appears to be built up past a predefined allowable amount (e.g., a potentially failing condition of the fluid filter), as such, service or replacement of the fluid filter is needed. While the above example uses percentages, it should be clear and appreciated that many different types of delineations are possible that correspond to many different types of notifications and/or conditions. Further, these delineations may use other types of indicators other than or in addition to percentages. For example, a rolling average may be used and the determination may be based on the rolling average being above a threshold pressure drop for three straight months (or another prescribed amount of time, or miles, or hours of operation, etc.). Moreover, as mentioned above, in one embodiment, the filter module 160 may use this determination to predict when the fluid filter may need to be serviced (e.g., replaced, inspected, monitored, etc.). Accordingly, the filter module 160 may track and log the determinations over an extended period of time and use these determinations with one or more predictive processes based on other types of data (e.g., fluid type, weather conditions, etc.) to predict when various service events should occur. These processes may be implemented over a fleet management system to enable a fleet manager to predict and budget for when various services may need to occur.

In Table 1, a sample of fluid filter test data is shown. The test data includes the inlet pressure data 170, the outlet pressure data 172 (e.g., oil rifle pressure, etc.), the engine speed data 174 (e.g., engine RPM, etc.), and the temperature data 176 (e.g., oil pan temperature, etc.). The test data further includes the actual outlet pressure (e.g., filter outlet pressure, etc.) at the fluid filter outlet 129 of the fluid filter 128. According to the present disclosure, Applicants have used this and other test to determine a process for determining the pressure drop across the fluid filter 128. Therefore, the determined pressure drop is compared to the true pressure drop across the fluid filter 128 to determine the accuracy (e.g., percent error, etc.) of the process. As shown, the determined process has a low error percentage, which indicates that the process is a substantially accurate process for determining the pressure drop across the oil filter.

TABLE 1

| Inlet Pressure | Filter Outlet Pressure | Oil Rifle Pressure | Oil Pan Temperature | Engine RPM | Calculated ΔP | True ΔP | % Error |
|---|---|---|---|---|---|---|---|
| 58.9 | 49.4 | 42.0 | 213.2 | 2401 | 9.57 | 9.5 | −0.74% |
| 58.8 | 49.2 | 41.8 | 214.0 | 2401 | 9.64 | 9.6 | −0.37% |
| 58.7 | 49 | 41.8 | 214.7 | 2401 | 9.57 | 9.7 | 1.31% |
| 58.5 | 48.9 | 41.5 | 215.4 | 2400 | 9.63 | 9.6 | −0.31% |
| 58.4 | 48.8 | 41.4 | 216.0 | 2401 | 9.63 | 9.6 | −0.32% |
| 58.4 | 48.8 | 41.4 | 216.7 | 2401 | 9.64 | 9.6 | −0.39% |
| 58.3 | 48.7 | 41.3 | 217.2 | 2401 | 9.64 | 9.6 | −0.38% |
| 58.4 | 48.7 | 41.4 | 217.7 | 2400 | 9.65 | 9.7 | 0.56% |
| 58.5 | 48.7 | 41.2 | 218.3 | 2400 | 9.85 | 9.8 | −0.48% |
| 58.4 | 48.6 | 41.2 | 218.9 | 2401 | 9.78 | 9.8 | 0.16% |
| 58.2 | 48.6 | 41.1 | 219.3 | 2400 | 9.71 | 9.6 | −1.17% |
| 58.3 | 48.5 | 41.1 | 219.8 | 2400 | 9.79 | 9.8 | 0.14% |
| 58.2 | 48.5 | 41.1 | 220.4 | 2400 | 9.72 | 9.7 | −0.24% |
| 58.2 | 48.6 | 41.1 | 219.3 | 2400 | 9.71 | 9.6 | −1.17% |
| 58.3 | 48.5 | 41.1 | 219.8 | 2400 | 9.79 | 9.8 | 0.14% |
| 58.2 | 48.5 | 41.1 | 220.4 | 2400 | 9.72 | 9.7 | −0.24% |
| 58.3 | 48.5 | 41.0 | 220.9 | 2401 | 9.86 | 9.8 | −0.62% |
| 58.1 | 48.4 | 40.9 | 221.3 | 2400 | 9.79 | 9.7 | −0.92% |
| 58.1 | 48.3 | 40.9 | 221.8 | 2400 | 9.79 | 9.8 | 0.07% |

In one embodiment, a regression model is applied to the data in Table 1 to determine the process that defines the pressure drop across the fluid filter 128. The process (e.g., formula, algorithm, equation, etc.) may be represented by the following expression:

$$\Delta P_{calc} = a\omega^2 + b\omega T + c\omega + dT + eP_{out} + fP_{in} + g \qquad (1)$$

where $\Delta P_{calc}$ is the determined pressure drop across the fluid filter 128, $\omega$ is the engine speed of the engine 112 (e.g., the engine speed data 174, etc.), T is the temperature of the fluid flow (e.g., the temperature of the filtered fluid flow at the oil pan, the temperature data 176, etc.), $P_{out}$ is the outlet pressure of the fluid measured by the outlet pressure sensor 144 (e.g., the outlet pressure data 172, downstream of the fluid filter 128, etc.), $P_{in}$ is the inlet pressure of the fluid measured by the inlet pressure sensor 142 (e.g., the inlet pressure data 170, upstream of the fluid filter 128, etc.), a-f are coefficients, and g is a constant. The values of a through g are shown in Table 2, according to the example embodiment. In other embodiments, a through g may vary based on the fluid temperature, the engine speed, the type of fluid, the fluid pressure, the engine system 100, and the like.

TABLE 2

| Constant | Value |
| --- | --- |
| a | 9.98797E−07 |
| b | −1.07612E−05 |
| c | −1.69188E−03 |
| d | 0.0352611 |
| e | −0.631743 |
| f | 0.690247 |
| g | −8.25661 |

Referring back to Table 1, as shown, the determined process (equation (1) with the coefficient values shown in Table 2) consistently determines the pressure drop across the fluid filter 128 within less than a 5% error from the true pressure drop. In fact, the process has been verified to be within an average error of less than 1% thereby facilitating a substantially accurate determination of the pressure drop across the fluid filter 128. It should be understood that the coefficient values and process are illustrative only. In other embodiments, the coefficient values and equation itself may depart from the equation illustrated herein. However, those departures may still embody the spirit and scope of the present disclosure such that their applications are intended to fall within the scope of the present disclosure.

Figure 3:
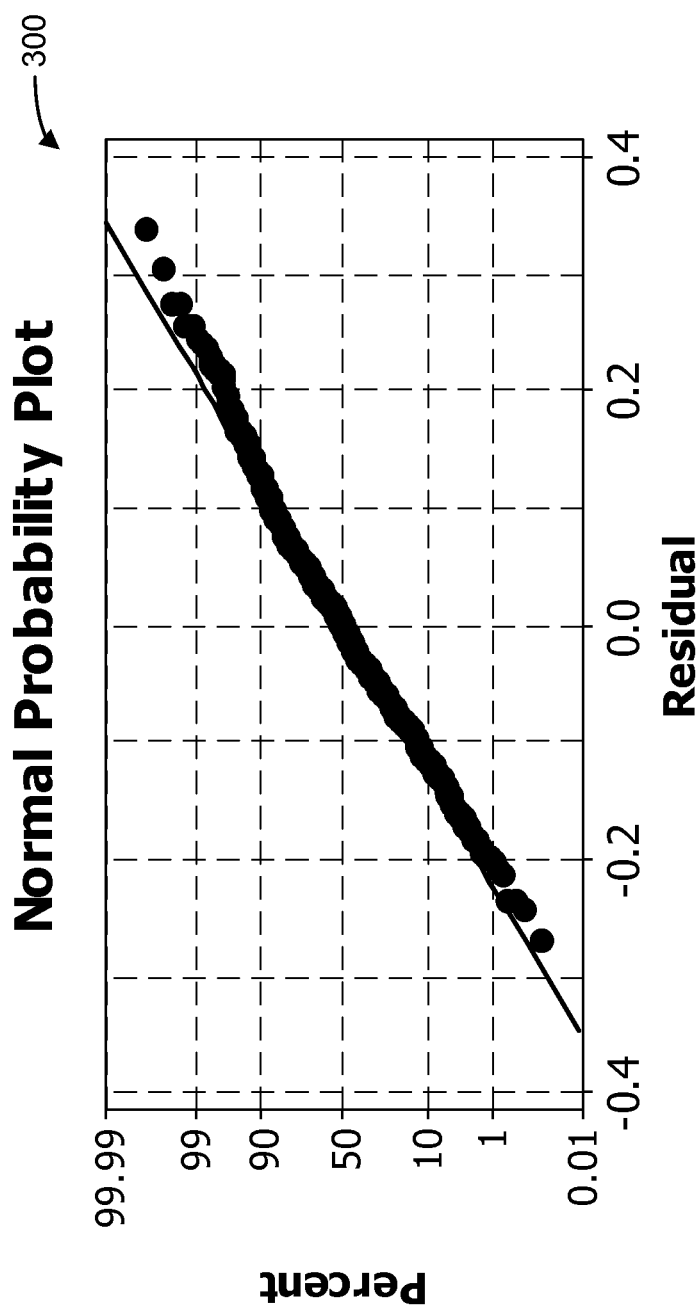
FIG. 3 is a normal probability plot of test data for a fluid filter system, according to an example embodiment.
Figure 4:
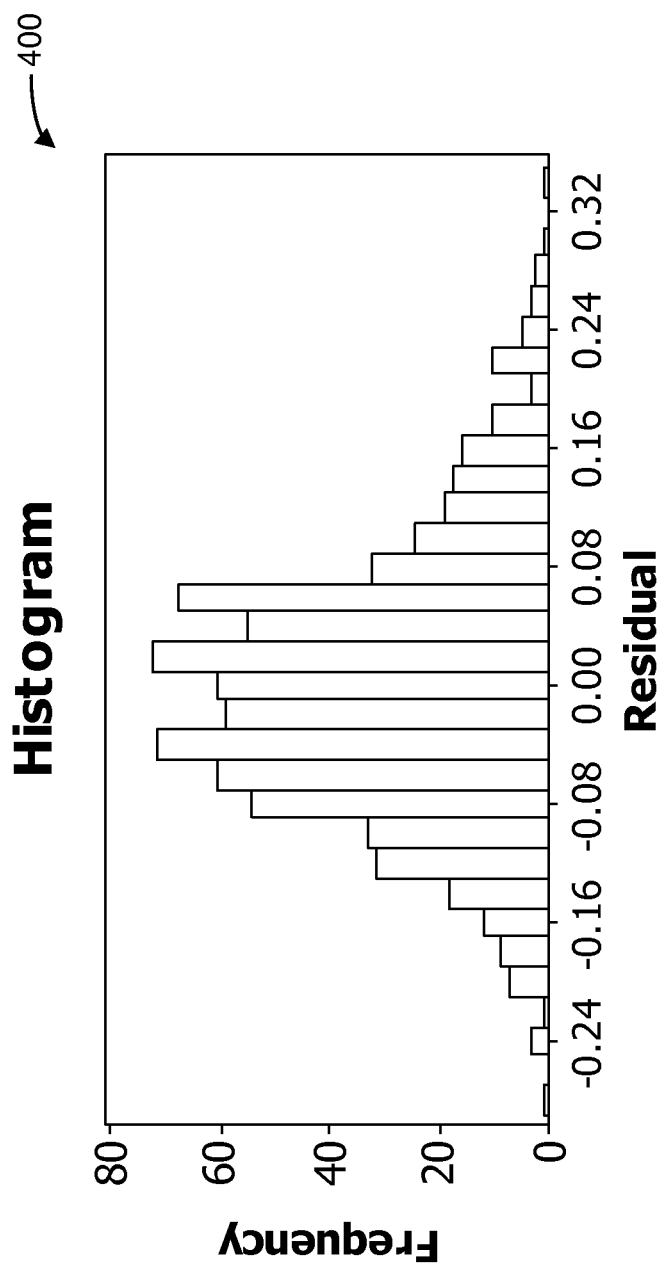
FIG. 4 is a histogram of test data for a fluid filter system, according to an example embodiment.
Figure 5:
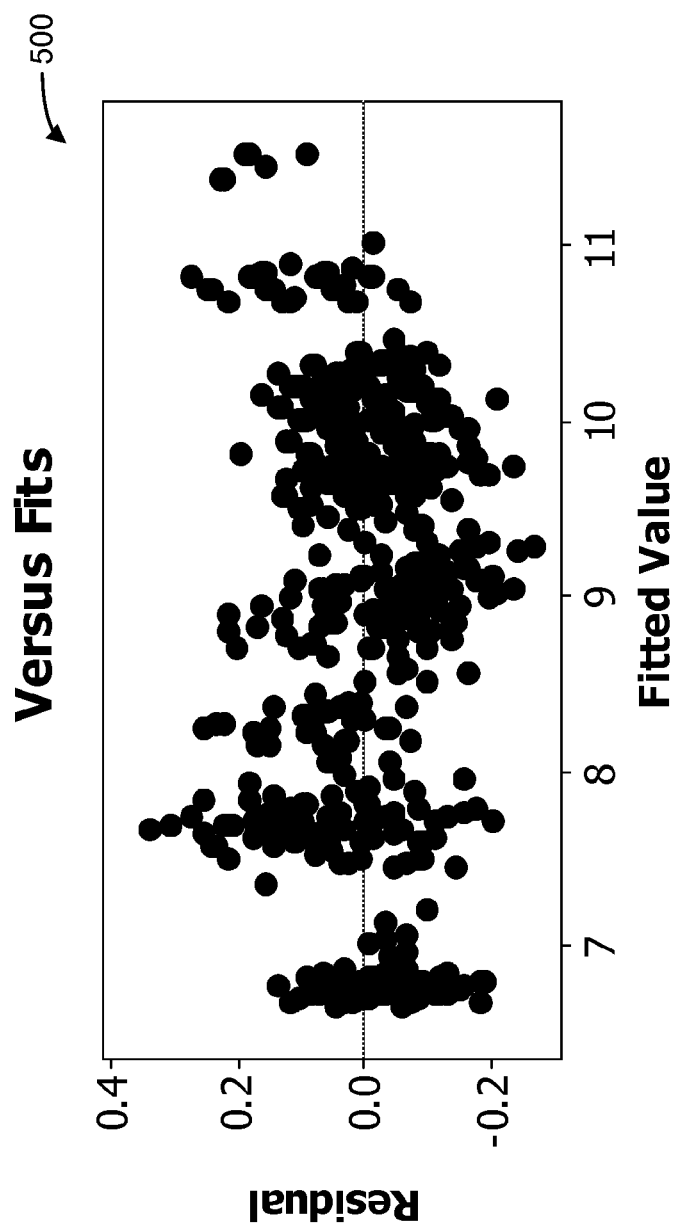
FIG. 5 is a residuals versus fits plot of test data for a fluid filter system, according to an example embodiment.
Figure 6:
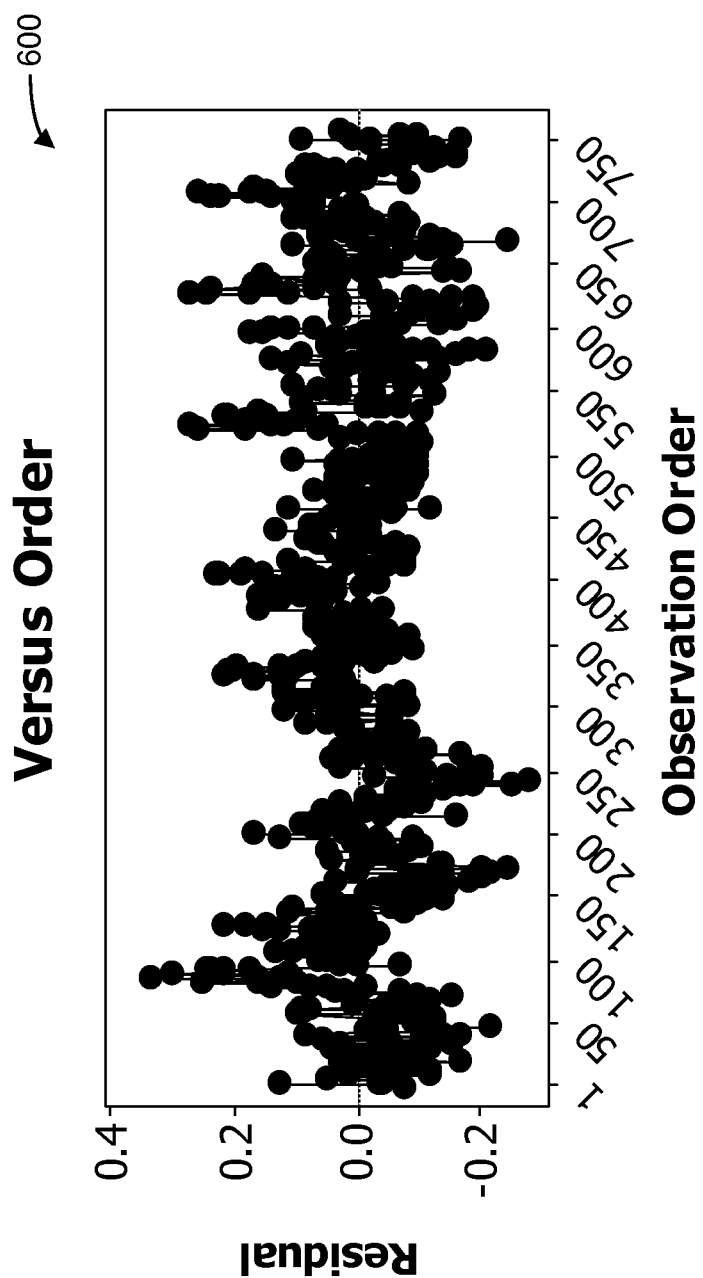
FIG. 6 is a residuals versus order plot of test data for a fluid filter system, according to an example embodiment.

Referring to FIGS. 3-4, the normal probability plot 300 and the histogram 400 show that the data is normally distributed. Referring to FIGS. 5-6, versus fits plot 500 and the versus order plot 600 show that there is no serial correlation (e.g., the data is not dependent on time, etc.).

Referring back to FIG. 2, the fluid module 161 is structured to interpret the fluid data 180. As described above, the fluid data 180 may include the type of fluid (e.g., engine oil, etc.) and the viscosity grade of the fluid inputted by an operator via the operator I/O device 130. The fluid module 161 may also be structured to acquire additional fluid data 180 such as a time since a last oil change (e.g., number of days, months, etc.), a length of use of the engine system 100 since the last oil change (e.g., hours of operation, miles driven, etc.), a level of engine oil (e.g., via the fluid sensor 149, etc.), the quality of the engine oil (e.g., degraded, clean, etc.), and the like. In conjunction with the pressure determination (described above), the fluid module 161 may thereby determine when an oil change may be needed responsive to the fluid data 180 and notify (e.g., alert, etc.) an operator (e.g., via the operator I/O device 130, an indicator lamp, etc.). In some embodiments, the fluid module 161 and the filter module 160 may notify the operator that the fluid filter 128 and the engine oil need to be replaced. For example, the fluid module 161 and the filter module 160 may work in conjunction to determine the optimal (e.g., most efficient, etc.) time to change both the engine oil and the fluid filter 128. In other embodiments, the controller 150 may notify the operator that one of the fluid filter 128 and the engine oil need to be serviced. For example, the engine oil may begin to degrade before the fluid filter 128 approaches a maximum permitted pressure drop (e.g., a threshold pressure drop, before the fluid flow becomes substantially restricted, etc.).

Figure 7:
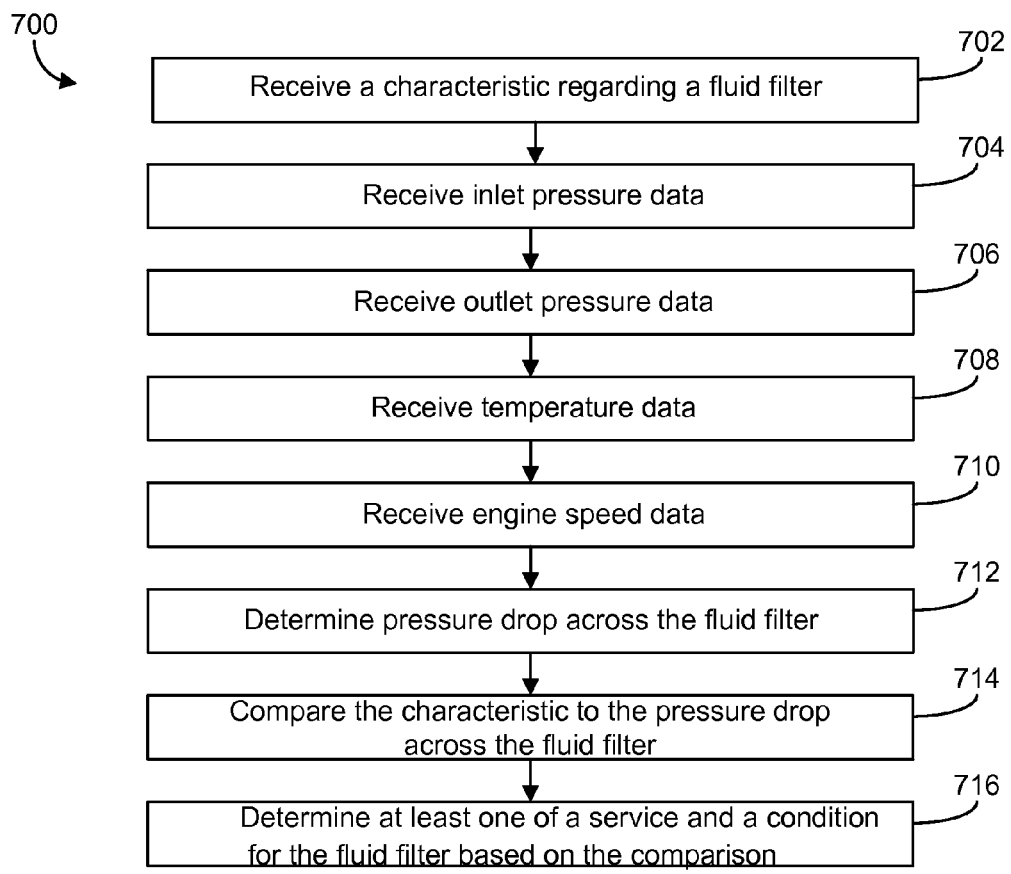
FIG. 7 is a block diagram of a method for determining the pressure drop across a fluid filter, according to an example embodiment.

Referring now to FIG. 7, a method 700 for determining the pressure drop across a fluid filter is shown according to an example embodiment. Method 700 may correspond with the controller 150 interpreting the inlet pressure data 170, the outlet pressure data 172, the engine speed data 174, and the temperature data 176 to determine a pressure drop across the fluid filter 128. Therefore, in one example embodiment, method 700 may be implemented with the controller 150 of FIGS. 1-2. Accordingly, where applicable, method 700 may be described in regard to FIGS. 1-2.

At process 702, the controller 150 receives a characteristic regarding a fluid filter. As described above, the characteristic may include a threshold pressure drop for the fluid filter (e.g., the fluid filter 128, etc.). At process 704, the controller 150 receives inlet pressure data 170. As described above, an inlet pressure sensor (e.g., inlet pressure sensor 142, etc.) acquires the pressure of an inlet flow of fluid (e.g., inlet engine oil flow 124, etc.) into a fluid filter (e.g., an oil filter, fluid filter 128, etc.) from an engine (e.g., engine 112, etc.). According to an example embodiment, the inlet pressure of the engine oil is measured at an oil cooler head (e.g., fluid filter inlet 127, etc.) of the oil filter. In other embodiments, the inlet pressure is acquired upstream of the fluid filter inlet 127 (e.g., prior to the inlet of the fluid filter 128, etc.). At process 706, the controller 150 receives outlet pressure data 172. As described above, an outlet pressure sensor (e.g., outlet pressure sensor 144, etc.) acquires the pressure of an outlet flow of fluid (e.g., filtered engine oil flow 126, etc.) exiting the fluid filter. According to an example embodiment, the outlet pressure is measured downstream of the fluid filter outlet 129 (e.g., at an oil rifle, etc.).

At process 708, the controller 150 receives temperature data 176. As described above, a temperature sensor (e.g., outlet temperature sensor 148, inlet temperature sensor 146, etc.) acquires the temperature of the fluid flow. The temperature of the fluid may substantially impact the measured pressure difference between the inlet pressure data 170 and the outlet pressure data 172. For example, a decrease in engine oil temperature increases engine oil pressure. According to an example embodiment, the temperature of the engine oil is acquired at, on, or near an oil pan downstream of the fluid filter 128. In other embodiments, the temperature may be acquired elsewhere along the fluid flow (e.g., at the fluid filter inlet 127, the fluid filter outlet 129, before/after the outlet pressure sensor 144, etc.).

At process 710, the controller receives engine speed data 174. As described above, a speed sensor measures the engine speed of the engine 112. The engine speed may substantially impact the measured pressure difference between the inlet pressure data 170 and the outlet pressure data 172. For example, an increase in engine speed increases engine oil pressure. At process 712, the controller 150 interprets the aforementioned data and determines a pressure drop across the fluid filter. For example, the controller 150 may apply one or more regression analysis methods (e.g., equation (1) above) to the inlet pressure data 170, the outlet pressure data 172, the engine speed data 174, and the temperature data 176 to determine a the pressure drop across the fluid filter 128.

At process 714, the controller 150 compares the characteristic (e.g., the threshold pressure drop, etc.) to the determined pressure drop across the fluid filter. The pressure drop across the fluid filter may fall within various ranges, defining the performance of the fluid filter. For example, the pressure drop may define the fluid filter as being substantially restricted (e.g., within 5% above or below the threshold pressure drop, etc.). At process 716, the controller 150 determines at least one of a condition and service for the fluid filter responsive to the comparison. The condition may refer to the level of restriction in the fluid filter (e.g., highly restricted, moderately restricted, low restriction) or an operational status of the fluid filter (e.g., normal, faulty, etc.). The condition may correlate with a service determination (e.g., inspect the fluid filter for a determined low restriction (e.g., a low pressure drop determination), monitor the fluid filter for a determined moderate restriction (e.g., a medium pressure drop determination relative to a threshold pressure drop), and service or replace the fluid filter for a determined high restriction). By way of example, pressure drops substantially close to the threshold pressure drop (e.g., within 5%, etc.) may cause the controller 150 to notify the operator that the fluid filter may need to be inspected. By way of another example, pressure drops within a predetermined range above the threshold pressure drop which indicates a large pressure differential across the filter (e.g., between 5% and 20%, etc.) may cause the controller 150 to notify the operator that monitoring is needed. According to another example embodiment, determined pressure differentials above 20% of the threshold pressure drop may cause an indicator lamp to notify the operator that the fluid filter should be serviced. Within 10% above the threshold pressure drop, a fault code is issued. Within 5% of the threshold pressure drop (above or below the threshold pressure drop), an alert is provided to inspect the fluid filter. Of course, and as mentioned above, the delineation of each response is highly configurable. In other embodiments, different percentage ranges, values (rather than percentages), other comparison types, an absolute application of the threshold pressure relative to the determined pressure may be used in determining a service for the fluid filter. All such variations are intended to fall within the spirit and scope of the present disclosure.

In some embodiments, the controller 150 may determine a service for a fluid (e.g., engine oil, etc.) responsive to data (e.g., fluid data 180, a fluid level, a fluid quality, etc.) regarding the fluid. By way of example, the controller 150 may notify the operator to change oil on a schedule (e.g., user defined, manufacturer defined, etc.) based on the amount of time (e.g., months, etc.) or the hours of operation since a last oil change. By way of another example, the controller 150 may monitor the level of engine oil such that when the oil level falls below a predefined threshold, the controller alerts an operator to either change or add more oil. By way of yet another example, the controller may monitor the quality of the engine oil and notify the operator to change the oil once the oil degrades past a certain quality (e.g., an amount of degradation, etc.). In one embodiment, the controller 150 may predict an optimal time to change the fluid filter and/or the fluid. For example, the prediction may substantially prevent the fluid filter 128 or the engine oil from being prematurely replaced (i.e., reducing maintenance costs, etc.).

With method 700 described above, an example implementation of method 700 may be as follows. Prior to or during operation of the engine or following the service of the fluid filter, the controller receives a characteristic regarding the fluid filter, such as a pressure drop threshold. The characteristic may be predefined or entered by an operator. During operation of the engine, the controller receives inlet pressure data, outlet pressure data, and temperature data regarding a flow of fluid through the fluid filter and the engine, as well as engine speed data. The controller interprets this data to determine a substantially accurate pressure drop across the fluid filter. The controller may acquire and interpret the data substantially continuously or at predefined increments (e.g., each time the engine starts, every hour of operation, every minute of operation, etc.). Based on the interpretation on the data, the controller tracks the pressure drop across the fluid filter over time. As the pressure drop begins to approach the threshold pressure drop (e.g., within 20%, etc.), the controller notifies the operator that future service may be required. As the pressure drop continues to increase, the controller may change the alert from future service required to service needed (e.g., within 5% of threshold, etc.). In one embodiment, the controller may predict when the service may be necessary based on the trend of pressure drops over time.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

Example and non-limiting module implementation elements include sensors (e.g., sensors 140) providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in machine-readable medium for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in machine-readable medium (or computer-readable medium), the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone computer-readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
an inlet pressure module structured to interpret inlet pressure data regarding a pressure of a fluid upstream of a fluid filter;
an outlet pressure module structured to interpret outlet pressure data regarding a pressure of the fluid downstream of the fluid filter;
an engine module structured to interpret engine speed data regarding a speed of an engine;
a temperature module structured to interpret temperature data regarding a temperature of the fluid; and
a filter module coupled to the inlet pressure module, the outlet pressure module, the engine module, and the temperature module, wherein the filter module is structured to determine a pressure drop across the fluid filter responsive to the inlet pressure data, the outlet pressure data, the engine speed data, and the temperature data.

2. The apparatus of claim 1,
wherein the filter module is structured to receive a threshold pressure drop for the fluid filter; and
wherein the filter module is structured to compare the determined pressure drop to the threshold pressure drop to determine a condition of the fluid filter based on the comparison.

3. The apparatus of claim 2,
wherein the filter module is structured to provide a notification including at least one of a monitoring notification and a replacement notification for the fluid filter based on the comparison;
wherein the filter module is structured to provide the replacement notification when the determined pressure drop exceeds the threshold pressure drop by more than a first predefined percentage;

wherein the filter module is structured to provide the monitoring notification when the determined pressure drop is within a second predefined percentage of the threshold pressure drop; and wherein the first predefined percentage is greater than the second predefined percentage.

4. The apparatus of claim 1, wherein the fluid filter is an oil filter and the fluid is oil.

5. The apparatus of claim 3, wherein the outlet pressure data is received from a first pressure sensor structured to acquire the outlet pressure data from an oil rifle; and wherein the inlet pressure data is received from a second pressure sensor structured to acquire the inlet pressure data from an oil cooler head.

6. The apparatus of claim 3, wherein the temperature data is indicative of a temperature of the oil in an oil pan.

7. The apparatus of claim 1, wherein the pressure drop determination is based on the following equation:

$$\text{Pressure Drop} = a\omega^2 + b\omega T + c\omega + dT + eP_{out} + fP_{in} + g,$$

wherein $\omega$ is the speed of the engine, T is the temperature of the fluid, $P_{out}$ is the pressure of the fluid downstream of the fluid filter, $P_{in}$ is the a pressure of the fluid upstream of the fluid filter, and g is a constant.

8. The apparatus of claim 1, wherein the filter module is structured to determine the pressure drop across the fluid filter with at least 90% accuracy relative to a true pressure differential across the fluid filter.

9. A system, comprising:

an engine;

a fluid filter system coupled to the engine, the fluid filter system including a filtering element structured to filter a fluid flowing through the fluid filter system; and a controller communicably coupled to the engine and the fluid filter system, the controller structured to:

receive inlet pressure data regarding a pressure of the fluid upstream of the filtering element;

receive outlet pressure data regarding a pressure of the fluid downstream of the filtering element;

receive engine speed data regarding a speed of the engine;

receive temperature data regarding a temperature of the fluid; and determine a pressure drop across the filtering element based on the inlet pressure data, the outlet pressure data, the engine speed data, and the temperature data.

10. The system of claim 9, further comprising:

a first pressure sensor positioned upstream of the filtering element and structured to acquire the inlet pressure data;

a second pressure sensor positioned downstream of the filtering element and structured to acquire the outlet pressure data;

an engine speed sensor structured to acquire the engine speed data; and a temperature sensor structured to acquire the temperature data.

11. The system of claim 10, wherein the inlet pressure data is indicative of a pressure of the fluid at an oil cooler head of the fluid filter system;

wherein the outlet pressure data is indicative of a pressure of the fluid in an oil rifle of the fluid filter system; and wherein the temperature data is indicative of a temperature of the fluid in an oil pan of the fluid filter system.

12. The system of claim 11, wherein the fluid is oil and the filtering element is an oil filter.

13. The system of claim 10, wherein the controller is structured to receive a threshold pressure drop for the filtering element, and wherein the controller is structured to compare the determined pressure drop to the threshold pressure drop to determine a condition of the filtering element based on the comparison.

14. The system of claim 13, wherein the controller is structured to provide a notification including at least one of a monitoring notification and a replacement notification for the filtering element based on the comparison;

wherein controller is structured to provide the replacement notification when the determined pressure drop exceeds the threshold pressure drop by more than a first predefined percentage;

wherein the controller is structured to provide the monitoring notification when the determined pressure drop is within a second predefined percentage of the threshold pressure drop; and wherein the first predefined percentage is greater than the second predefined percentage.

15. The system of claim 9, wherein the pressure drop determination is based on one or more regression processes, wherein the pressure drop determination is at least 90% accurate relative to a true pressure differential across the filtering element.

16. A method, comprising:

receiving inlet pressure data regarding a pressure of a fluid upstream of a fluid filter;

receiving outlet pressure data regarding a pressure of the fluid downstream of the fluid filter;

receiving engine speed data regarding a speed of an engine;

receiving temperature data regarding a temperature of the fluid; and determining a pressure drop across the fluid filter based on the inlet pressure data, the outlet pressure data, the engine speed data, and the temperature data.

17. The method of claim 16, further comprising receiving filter data, wherein the filter data includes a threshold pressure drop for the fluid filter.

18. The method of claim 17, further comprising determining a condition of the fluid filter based on a comparison of the threshold pressure drop to the determined pressure drop.

19. The method of claim 16, wherein the fluid filter is an oil filter and the fluid is oil;

wherein the inlet pressure data is indicative of a pressure of the fluid at an oil cooler head;

wherein the outlet pressure data is indicative of a pressure of the fluid in an oil rifle of a fluid filter system; and wherein the temperature data is indicative of a temperature of the oil in an oil pan.

20. The method of claim 16, wherein the pressure drop determination is based on one or more regression processes, wherein the pressure drop determination is at least 90% accurate relative to a true pressure differential across the fluid filter.

* * * * *